(12) United States Patent
Satish et al.

(10) Patent No.: US 8,806,651 B1
(45) Date of Patent: Aug. 12, 2014

(54) METHOD AND APPARATUS FOR AUTOMATING CONTROLLED COMPUTING ENVIRONMENT PROTECTION

(75) Inventors: Sourabh Satish, Fremont, CA (US); William Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 12/338,618

(22) Filed: Dec. 18, 2008

(51) Int. Cl.
*G06F 21/10* (2013.01)
*G06F 21/57* (2013.01)
*G06F 21/55* (2013.01)

(52) U.S. Cl.
CPC ............... *G06F 21/57* (2013.01); *G06F 21/55* (2013.01); *G06F 2216/15* (2013.01)
USPC .......................................................... 726/26

(58) Field of Classification Search
CPC ..... G06F 21/55; G06F 21/57; G06F 21/2216; G06F 21/15
USPC ...................................................... 726/22, 26
See application file for complete search history.

(56) References Cited

U.S. PATENT DOCUMENTS

| | | | | |
|---|---|---|---|---|
| 6,947,995 | B2 * | 9/2005 | Chang et al. | 709/231 |
| 7,072,984 | B1 * | 7/2006 | Polonsky et al. | 709/246 |
| 7,610,624 | B1 * | 10/2009 | Brothers et al. | 726/24 |
| 7,647,411 | B1 * | 1/2010 | Schiavone et al. | 709/229 |
| 7,849,507 | B1 * | 12/2010 | Bloch et al. | 726/22 |
| 2006/0075494 | A1 * | 4/2006 | Bertman et al. | 726/22 |
| 2006/0212925 | A1 * | 9/2006 | Shull et al. | 726/1 |
| 2007/0006305 | A1 * | 1/2007 | Florencio et al. | 726/22 |
| 2008/0028464 | A1 * | 1/2008 | Bringle et al. | 726/22 |
| 2008/0301796 | A1 * | 12/2008 | Holostov et al. | 726/12 |
| 2009/0248497 | A1 * | 10/2009 | Hueter | 705/10 |
| 2010/0235637 | A1 * | 9/2010 | Lu et al. | 713/168 |
| 2010/0269175 | A1 * | 10/2010 | Stolfo et al. | 726/22 |

OTHER PUBLICATIONS

Craig, Hacking Internet Kiosk's, Defcon 16, Retrieved from the Internet <URL: defcon.org/images/defcon-16/dc16-presentations/defcon-16-craig.pdf>, pp. 1-65 as printed.*
Barth et al.; The Security Architecture of the Chromium Browser; Sep. 2008; Retrieved from the Internet <URL: web.archive.org/web/20080913152646/http://crypto.stanford.edu/websec/chromium/chromium-security-architecture.pdf; pp. 1-10 as printed.*
Fette; The Chromium Blog Nov. 14, 2008; Retrieved from the Internet <URL: blog.chromium.org/2008/11/understanding-phishing-and-malware.html>; pp. 1-5 as printed.*

* cited by examiner

*Primary Examiner* — Michael Chao
(74) *Attorney, Agent, or Firm* — Wilmer Cutler Pickering Hale and Dorr LLP

(57) ABSTRACT

A method and apparatus for automating controlled computing environment protection is disclosed. In one embodiment, the method for automating controlled computing environment protection includes monitoring a controlled computing environment to process user activity information associated with a user computer and comparing the user activity information with abnormal behavior indicia to identify hostile user activity that denotes browser control circumvention.

16 Claims, 3 Drawing Sheets

METHOD AND APPARATUS FOR AUTOMATING CONTROLLED COMPUTING ENVIRONMENT PROTECTION

BACKGROUND OF THE INVENTION

1. Field of the Invention

Embodiments of the present invention generally relate to a browser attack prevention system for controlled computing environments and, more particularly, to a method and apparatus for automating controlled computing environment protection.

2. Description of the Related Art

In a typical computing environment, an organization may employ a number of technologies to produce and secure mission critical data. As an example, the organization may employ one or more security systems to protect the mission critical data as well as detect and/or mitigate network-based threats, such as malicious software programs, viruses, intrusions, SPAM and/or the like. The one or more security system may be used to prevent damage caused by malicious software programs that exploit various browser vulnerabilities.

For example, the organization may employ a kiosk computer to provide users with limited functionalities, such as restricted web access, at one or more computer terminals. The Kiosk computer is designed to receive commands and requests from the user terminal and perform various activities on behalf of the user computer. The users at the computer terminals are prevented from accessing data files, executing software programs, modifying a file system and/or perform various restricted activities.

Sometimes, such users desire to subvert various security features at the one or more computer terminals. Accordingly, one or more malicious software programs (e.g., Interactive Kiosk Attack Tools, such as iKat) may be downloaded and executed in order to circumvent browser control and access restricted web sites (e.g., adult web sites, malicious web sites and/or the like). The one or more malicious software programs may perform reconnaissance activity to design an effective strategy for exploiting one or more browser vulnerabilities (e.g., Flash Object vulnerabilities).

Therefore, there is a need in the art for a method and apparatus for automating controlled computing environment protection from malicious software programs.

SUMMARY OF THE INVENTION

Embodiments of the present invention generally include a method and apparatus for automating controlled computing environment protection. In one embodiment, the method for automating controlled computing environment protection includes monitoring a controlled computing environment to process user activity information associated with a user computer and comparing the user activity information with abnormal behavior indicia to identify hostile user activity that denotes browser control circumvention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a block diagram of a system 100 for automating controlled computing environment protection according to one or more embodiments. In one embodiment, the system 100 includes a user computer 102, a kiosk computer 104 and an illicit computer where each is coupled to each other through a network 106. Furthermore, the system 100 includes a controlled computing environment formed by the user computer 102 and the kiosk computer 104.

Figure 1:
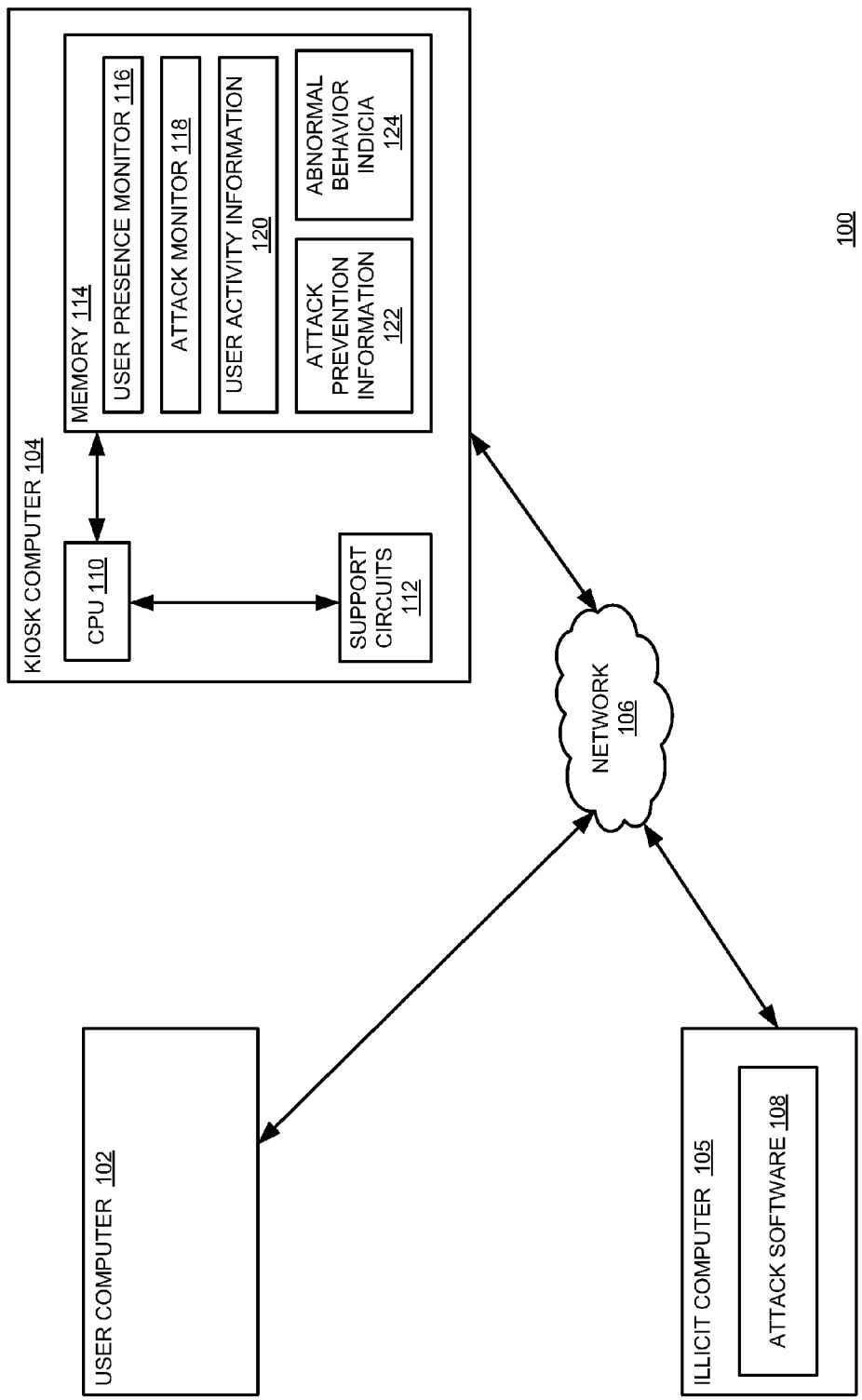
FIG. 1 is a block diagram of a system for automating controlled computing environment protection according to one or more embodiments.

The user computer 102 is a type of computing device (e.g., a laptop, a desktop, a Personal Desk Assistant (PDA), a tablet, a mobile phone and the like), such as those generally known in the art. The user computer 102 generally is a terminal with limited functionality. Usually, the user computer 102 cooperates with the kiosk computer 104 to provide a user with restricted web access by controlling a browser (i.e., a web browser application, such as WINDOWS Internet Explorer or MOZILLA FireFox).

The kiosk computer 104 is a type of computing device (e.g., a laptop, a desktop, a Personal Desk Assistant (PDA), a tablet, a mobile phone and the like) that comprises a central processing unit (CPU) 110, various support circuits 112 and a memory 114. The kiosk computer 104 generally implements browser control at the user computer 102 to prevent hostile user activity and/or otherwise abnormal behavior, such as exploiting a browser vulnerability to download and execute malicious software programs (e.g., drive-by downloading attacks). The CPU 110 may comprise one or more commercially available microprocessors or microcontrollers that facilitate data processing and storage. Various support circuits 112 facilitate operation of the CPU 110 and may include clock circuits, buses, power supplies, input/output circuits and/or the like. The memory 114 includes a read only memory, random access memory, disk drive storage, optical storage, removable storage, and the like. The memory 114 includes various software packages, such as a user monitor 116 and an attack monitor 118. The memory 114 includes various data, such as user activity information 120, attack prevention information 122 and abnormal behavior indicia 124.

The illicit computer 105 is a type of computing device (e.g., a laptop, a desktop, a Personal Desk Assistant (PDA), a tablet, a mobile phone and the like), such as those generally known in the art. As described below, the illicit computer 105 includes various malicious software programs, such as attack software 108, that are configured to facilitate hostile user activity. In one embodiment, the illicit computer 105 communicates one or more malicious software programs to the kiosk computer 104 for execution.

The network 106 comprises a communication system that connects computers by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

As described above, the illicit computer 105 includes the attack software 108 that communicates various commands and requests to the kiosk computer 104 in an effort to exploit various browser vulnerabilities and/or circumvent browser control. In one embodiment, the attack software 108 includes software code that is configured to circumvent browser control and permit the user to perform various restricted activities (e.g., access a blacklisted website, download malicious software programs, view a file system in order to add, modify and/or delete data files and/or the like). In one embodiment, the attack software 108 is accessed from the illicit computer 105 (e.g., a web site) and executed at the kiosk computer 104 (e.g., Interactive Kiosk Attack Tools, such as iKat).

The user presence monitor 116 includes software code that is designed to detect and/or record user activity within a controlled computing environment according to one or more embodiments. In one embodiment, the user presence monitor 116 recognizes user interaction at the user computer 104 and generates the user activity information 120. Then, the user presence monitor 116 communicates the user activity information to the attack monitor 118 to prevent browser control circumvention by the attack software 108.

According to various embodiments, the attack monitor 118 includes software that is configured to identify hostile user activity that denotes browser control circumvention by the illicit computer 105 on behalf of the user. In operation, the attack monitor 118 compares the user activity information 120 with the abnormal behavior indicia 124 to determine that the illicit computer 105 is performing various reconnaissance activities and/or exploiting various browser vulnerabilities. If the attack monitor 118 identifies the hostile user activity, the attack monitor 118 updates the attack prevention information 122 as explained further below.

Generally, the user activity information 120 indicates one or more actions initiated by the user. In addition, the user activity information 120 includes various browser activities performed on behalf of the user computer 102, such as network service requests (e.g., a request for web page data or an executable file), that denote browser control circumvention. For example, the user may access a web page and download a malicious software program, which initiates one or more network service requests on behalf of the user. In one or more embodiments, the network service requests include reconnaissance activity and/or browser vulnerability exploitation as explained further below.

Generally, the attack software 108 performs the reconnaissance activity to collect information regarding the controlled computing environment (e.g., account data, Internet Protocol (IP) addresses, known or unknown browser vulnerabilities, network topologies, hostnames, security controls and/or the like). In other words, the reconnaissance activity is intended to assess internet security and browser control robustness at the kiosk computer 104 in order to design an effective malicious attack. As such, the reconnaissance activity usually precedes such malicious attacks. According to one or more embodiments, the reconnaissance activity may include one or more actions that enumerate one or more installed software applications, access one or more invalid uniform resource locators (URLs), attempt to access one or more inaccessible files, open one or more dialog boxes, enumerate one or more file handlers (e.g., URI handlers) and/or the like.

Furthermore, the attack software 108 performs browser vulnerability exploitation to circumvent browser control by the kiosk computer 104. As such, the user activity information 120 may include one or more actions that exploit various known and/or unpatched browser vulnerabilities, such as flash object (.WMF and .SWF) vulnerabilities, java applet (.JAR) vulnerabilities, help file (.CHM) vulnerabilities and/or the like. In another embodiment, the user activity information 120 may include one or more actions that exploit one or more unknown browser vulnerabilities. In addition, the attack monitor 118 (e.g., SYMANTEC Browser Defender) applies one or more behavior-based techniques to determine whether a portion of the user activity information 120 is abnormal. Such abnormal user activity may be hostile and therefore, denote browser control circumvention. Accordingly, the attack monitor 118 identifies and/or prevents hostile user activity associated with known and/or unknown browser vulnerabilities exploits.

The attack prevention information 122 is utilized to protect the controlled computing environment from browser control circumvention and/or malicious operations according to one or more embodiments. In one embodiment, connections between the kiosk computer and one or more computers (e.g., web servers, illicit computers and/or the like) are established based on the attack prevention information 122. For example, the attack monitor 118 uses the attack prevention information 122 to determine whether to establish a connection with the illicit computer 105. If the attack prevention information 122 (e.g., a blacklist) includes a URL for the illicit computer 105, then the attack monitor 118 does not establish a connection with the illicit computer 105. As such, data communications with the illicit computer 105 are prevented in order protect the kiosk computer 104 from browser control circumvention and/or block execution of malicious software programs, such as the attack software 108.

On the other hand, if the attack prevention information 122 does not include the URL for the illicit computer 105 and the attack monitor 118 identifies hostile user activity, then the URL is added to the attack prevention information 122 to prevent subsequent data communications (e.g., browser activity) with the illicit computer 105. If, however, the attack prevention information 122 does not include a URL for the illicit computer 105 but does includes one or more fingerprints for the attack software 108, then the attack monitor 118 blocks execution of the attack software 108 regardless of a source. In other words, the attack monitor 118 applies the one or more fingerprints to block execution of the attack software 108 from any computer according to one or more embodiments.

According to one or more embodiments, the abnormal behavior indicia 124 includes information regarding hostile user activity. As explained in the present disclosure, the hostile user activity includes reconnaissance activity, known browser vulnerability exploitation and/or otherwise abnormal user activity that indicates an exploit of an unknown browser vulnerability. The abnormal behavior indicia 124 is generated as browser control circumvention attacks fail. For example, the abnormal behavior indicia 124 may include information for identifying an attempt to access an invalid URL and/or an inaccessible file. As another example, the abnormal behavior indicia 124 may include information for identifying one or more actions that exploit various known and/or unpatched browser vulnerabilities, such as flash object (.WMF and .SWF) vulnerabilities, java applet (.JAR) vulnerabilities, help file (.CHM) vulnerabilities and/or the like. In another embodiment, the abnormal behavior indicia 124 may include information for identifying one or more actions that exploit one or more unknown browser vulnerabilities. In addition, the abnormal behavior indicia 124 may include one or more behavior-based techniques for identifying abnormal user activity that may be hostile and therefore, denotes browser control circumvention.

The user presence monitor 116 and the attack monitor 118 cooperate to provide automated controlled computing environment protection according to various embodiments. In one embodiment, the user presence monitor 116 detects the user computer 102 and records the user activity information 120, which is communicated to the attack monitor 118. Subsequently, the attack monitor 118 compares the user activity information 120 with the abnormal behavior indicia 124 and identifies hostile user activity in which the attack software 108 is attempting to circumvent browser control at the kiosk computer 104.

Accordingly, the attack monitor 118 mitigates the hostile user activity and/or protects the kiosk computer 104 from browser control circumvention using the attack prevention information 122. In one embodiment, the attack computer 118 prevents data communications (e.g., subsequent browser activity such as commands and/or requests) with the user computer 102 and/or the illicit computer 105 for a definable time period. In one embodiment, adds a uniform resource locator (URL) to the attack prevention information 122 to avoid establishing a connection with the user computer 102 in the future. In yet another embodiment, the attack monitor 118 terminates a connection with the user computer 102 and/or the illicit computer 105.

In another embodiment, the attack monitor 118 examines the user activity information 120 and identifies the attack software 108. For example, the attack monitor 118 identifies one or more malicious browser plug-in files associated with the hostile user activity. Then, the attack monitor 118 generates one or more fingerprints for the one or more malicious browser plug-in files, which are added to the attack prevention information 122. In one embodiment, the one or more fingerprints are applied to subsequent browser activity to block execution of the one or more malicious browser plug-in files. In another embodiment, the attack monitor 118 installs various hooks (e.g., user-mode hooks and/or kernel-mode hooks) that are configured to fail one or more operations by the one or more malicious browser plug-in files (e.g., creating dialog boxes, executing Flash objects and/or the like). For example, the attack monitor 118 may install a hook that fails Flash ActiveX Control instantiations if a .SWF or a .JAR file is about to load (i.e., parameter/swf or parameter/jar files).

Figure 2:
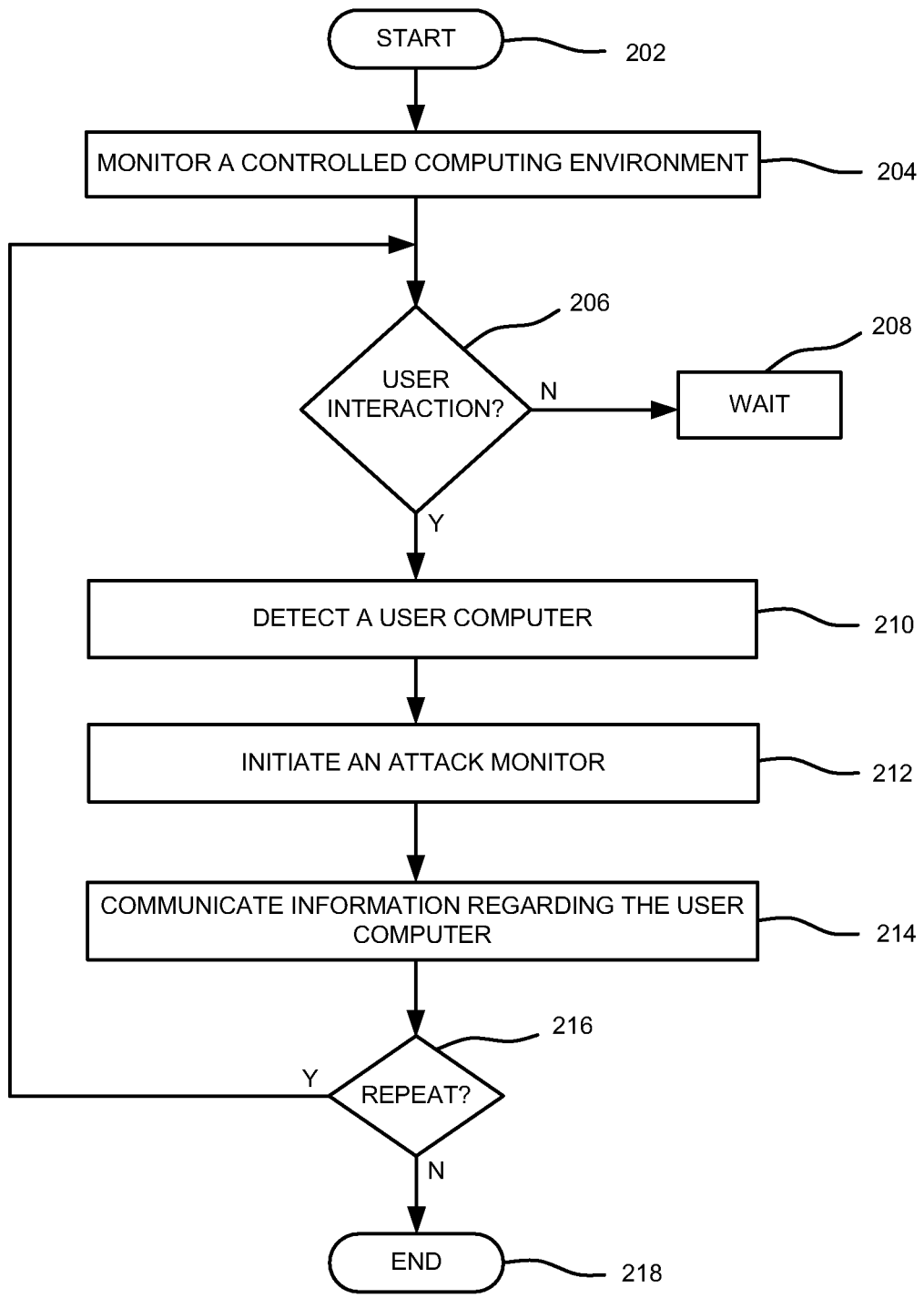
FIG. 2 is a flow diagram of a method for generating user activity information according to one or more embodiments.

FIG. 2 is a flow diagram of a method 200 for detecting a user computer within a controlled computing environment according to one or more embodiments.

In one embodiment, the method 200 starts at step 202 and proceeds to step 204 where a controlled computing environment is monitored.

At step 206, a determination is made as to whether there is user interaction at a user computer within the controlled computing environment. If it is determined that there is user interaction, then the method 200 proceeds 210. If it is determined that there is no user interaction, then the method 200 proceeds 208 where the method 200 waits. At step 210, the user computer (e.g., the user computer 102 of FIG. 1) within the controlled computing environment is detected. At step 212, an attack monitor (e.g., the attack monitor 118 of FIG. 1) is initiated. At step 214, information regarding the user computer is communicated to the attack monitor. At step 216, a determination is made as to whether user computer detection is to be repeated. If it is determined that the user computer detection is to be repeated, then the method 200 returns to step 206. If it is determined that the user computer detection is not to be repeated, then the method 200 proceeds to step 218. At step 218, the method 200 ends.

Figure 3:
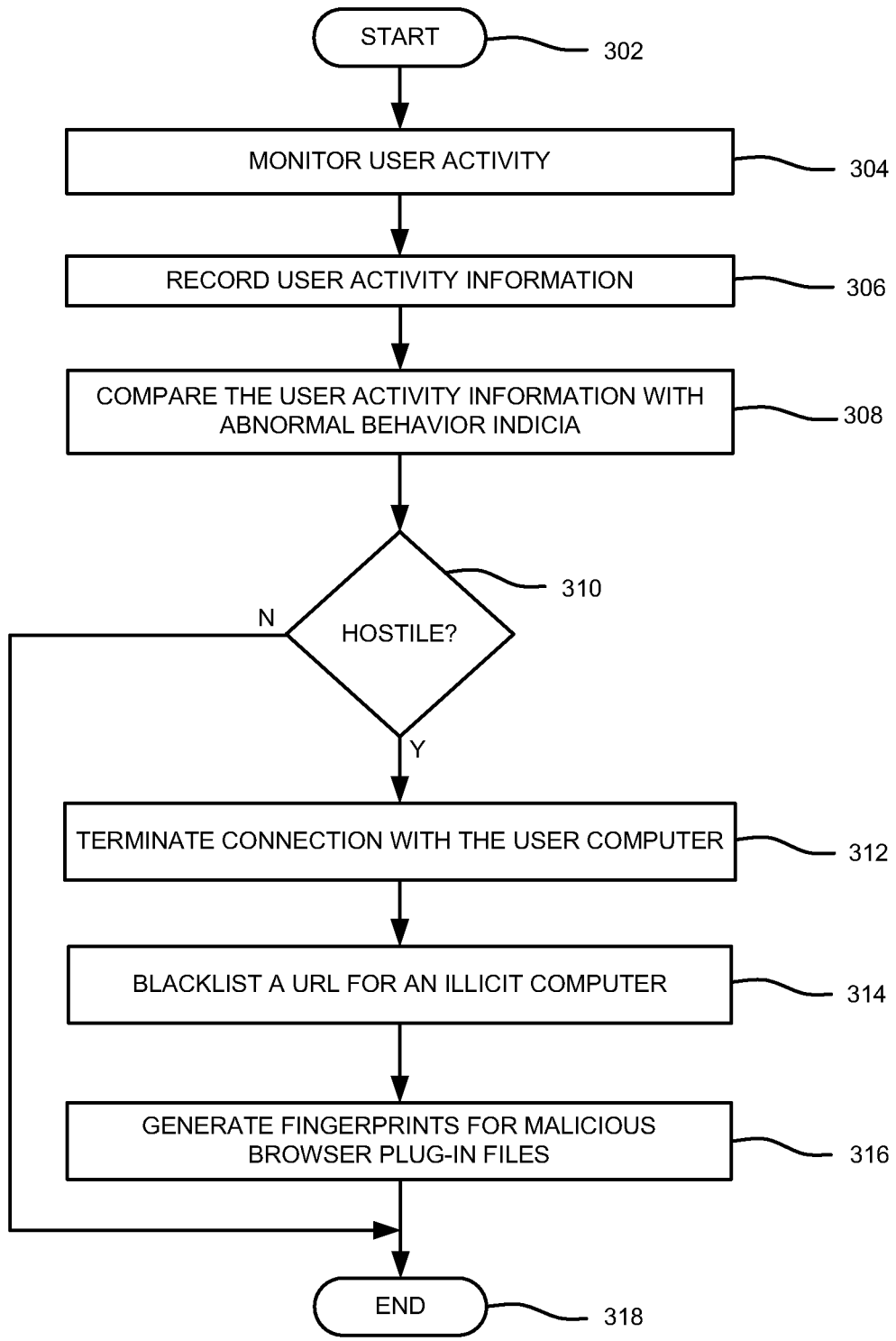
FIG. 3 is a flow diagram of a method for automating controlled computing environment protection according to one or more embodiments.

FIG. 3 is a flow diagram of a method 300 for automating controlled computing environment protection according to one or more embodiments. In one embodiment, the method 300 starts at step 302 and proceeds to step 304 where user activity is monitored.

At step 306, user activity information (e.g., the user activity information 120 of FIG. 1) is recorded. At step 308, the user activity information is compared with abnormal behavior indicia (e.g., the abnormal behavior indicia 124 of FIG. 1). At step 310, a determination is made as to whether the user activity is hostile. If it is determined that the user activity information includes hostile user activity, then the method 300 proceeds to step 312. If it is determined that the user activity information does not include hostile user activity, then the method 300 proceeds to step 318. At step 312, a connection with the user computer is terminated. Alternatively, the user is returned to a home page or provided with an alert. At step 314, a URL for a computer that is a source of the hostile user activity is blacklisted. In other words, the URL for a source of a malicious browser plug-in file (e.g., the attack software 108) is added to attack prevention information. At step 316, fingerprints for the malicious browser plug-in file is generated. At step 318, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for automating controlled computing environment protection, comprising:
   receiving, at a kiosk from a user computer, user activity information comprising a request for a network service request for content that is subsequently loaded on a browser within the kiosk;
   monitoring, at the kiosk, a controlled computing environment to process the user activity information;
   comparing, at the kiosk, the user activity information with abnormal behavior indicia to identify hostile user activity caused by the content and associated with browser control circumvention, wherein browser control circumvention comprises performing various activities restricted by browser control comprising at least one of accessing a blacklisted website, accessing an invalid uniform resource locator, downloading a browser plug-in, and attempting to view a file system;
   determining, at the kiosk, a uniform resource locator for an illicit computer related to the network service request, wherein the illicit computer is a source of the hostile activity associated with browser control circumvention, wherein the uniform resource locator is added to attack prevention information for a definable time period to protect the controlled computing environment from browser control circumvention; and
   preventing, at the kiosk, further data communications with the illicit computer based on the attack prevention information.

2. The method of claim 1 further comprising terminating a connection between the controlled computing environment and at least one of the user computer or an illicit computer, wherein the illicit computer is a source of the hostile activity.

3. The method of claim 1 further comprising identifying at least one malicious browser plug-in file associated with the hostile activity.

4. The method of claim 3 further comprising installing a hook that is configured to fail at least one operation by the at least one malicious browser plug-in file.

5. The method of claim 4 further comprising blocking execution of the at least one malicious browser plug-in file.

6. The method of claim 4 further comprising generating at least one fingerprint for the identified at least one browser plug-in file, wherein the at least one fingerprint is added to attack prevention information.

7. The method of claim 1 further comprising establishing at least one connection with at least one computer based on attack prevention information.

8. The method of claim 1, wherein comparing the user activity information with the abnormal behavior indicia further comprises identifying at least one operation for accessing at least one inaccessible file.

9. The method of claim 1, wherein the hostile activity comprises at least one of reconnaissance activity or browser vulnerability exploitation.

10. The method of claim 1, wherein the abnormal behavior indicia comprises information regarding reconnaissance activity and at least one known browser vulnerability.

11. An apparatus for automating controlled computing environment protection, comprising:
at least one computer processor communicatively coupled to memory, wherein the at least one computer processor comprises:
a user presence monitor for detecting a user computer within a controlled computing environment and processing user activity information comprising a request for a network service request for content that is subsequently loaded on a browser within a kiosk associated with the user computer; and
an attack monitor for comparing the user activity information with abnormal behavior indicia to identify hostile activity caused by the content and associated with browser control circumvention, wherein browser control circumvention comprises performing various activities restricted by browser control comprising at least one of accessing a blacklisted website, accessing an invalid uniform resource locator, downloading a browser plug-in, and attempting to view a file system, wherein the attack monitor determines a uniform resource locator for an illicit computer related to the network service request, wherein the uniform resource locator is used to block data communications for a definable time period from the illicit computer to protect the controlled computing environment from browser control circumvention, and wherein the illicit computer is a source of the hostile activity associated with browser control circumvention, and wherein the attack monitor prevents further data communications with the illicit computer based on the attack prevention information.

12. The apparatus of claim 11, wherein the attack monitor identifies at least one malicious browser plug-in file associated with the hostile activity.

13. The apparatus of claim 12, wherein the attack monitor blocks execution of the at least one malicious browser plug-in file using attack prevention information.

14. The apparatus of claim 13, wherein the attack monitor generates at least one fingerprint for the identified at least one malicious browser plug-in file to prevent execution of the identified at least one malicious browser plug-in file.

15. The apparatus of claim 13, wherein the attack monitor installs a hook that is configured to fail at least one operation by the at least one malicious browser plug-in file.

16. A system for automating controlled computing environment protection, comprising:
a user computer for providing a user with restricted web access within a controlled computing environment; and
a kiosk computer coupled with the user computer, comprising:
a user presence monitor for processing user activity information associated with the user computer comprising a request for a network service request for content that is subsequently loaded on a browser within the kiosk computer, and
an attack monitor for comparing the user activity information with abnormal behavior indicia to identify hostile activity caused by the content and associated with browser control circumvention, wherein browser control circumvention comprises performing various activities restricted by browser control comprising at least one of accessing a blacklisted website, accessing an invalid uniform resource locator, downloading a browser plug-in, and attempting to view a file system, wherein the attack monitor determines a uniform resource locator for an illicit computer related to the network service request, wherein the uniform resource locator is used to block data communications for a definable time period from the illicit computer to protect the controlled computing environment from browser control circumvention, wherein the illicit computer is a source of the hostile activity associated with browser control circumvention, and wherein the attack monitor prevents further data communications with the illicit computer based on the attack prevention information.

* * * * *